United States Patent
Mohri

(10) Patent No.: US 9,580,068 B2
(45) Date of Patent: Feb. 28, 2017

(54) HYBRID VEHICLE DRIVE CONTROL SYSTEM

(71) Applicant: Nissan Motor Co., Ltd., Yokohama, Kanagawa (JP)

(72) Inventor: Takanobu Mohri, Chigasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 60 days.

(21) Appl. No.: 14/356,736

(22) PCT Filed: Oct. 31, 2012

(86) PCT No.: PCT/JP2012/078131
§ 371 (c)(1),
(2) Date: May 7, 2014

(87) PCT Pub. No.: WO2013/077161
PCT Pub. Date: May 30, 2013

(65) Prior Publication Data
US 2015/0051767 A1     Feb. 19, 2015

(30) Foreign Application Priority Data
Nov. 25, 2011     (JP) .................... 2011-257979

(51) Int. Cl.
*B60L 9/00*     (2006.01)
*B60L 11/00*     (2006.01)
(Continued)

(52) U.S. Cl.
CPC ............. *B60W 20/40* (2013.01); *B60K 6/48* (2013.01); *B60K 6/543* (2013.01); *B60L 11/005* (2013.01);
(Continued)

(58) Field of Classification Search
CPC ...... B60W 10/08; B60W 20/00; B60W 10/06; B60W 10/02; B60W 2510/244;
(Continued)

(56) References Cited

U.S. PATENT DOCUMENTS 4,869,332 A * 9/1989 Fujita ................... B62M 23/00
180/219
6,026,921 A * 2/2000 Aoyama ................ B60K 6/48
123/348

(Continued)

FOREIGN PATENT DOCUMENTS

JP     2006-306210 A     11/2006
JP     2008-105494 A     5/2008
(Continued)

*Primary Examiner* — Khoi Tran
*Assistant Examiner* — Jorge Peche
(74) *Attorney, Agent, or Firm* — Global IP Counselors, LLP

(57) ABSTRACT

A hybrid vehicle drive control system is configured to start an engine irrespective of a motor rotational speed or a driving scene. In the hybrid vehicle drive control system, upon receiving an engine startup request, the engine is started by engaging a first clutch provided between the engine and a motor using the torque of the motor. A second clutch is provided between the motor and the drive wheel. The second clutch is disengaged by a second clutch control operation to reduce the motor rotation speed as a result of the motor rotational speed control by a motor rotation speed-controlling operation. The control system may thus increase the maximum motor output enable torque to ensure the start of the engine by the surplus torque irrespective of a motor rotational speed or driving scene.

2 Claims, 9 Drawing Sheets

(51) Int. Cl.

| | |
|---|---|
| *G05D 1/00* | (2006.01) |
| *B60W 20/00* | (2016.01) |
| *B60K 6/48* | (2007.10) |
| *B60K 6/543* | (2007.10) |
| *B60L 11/14* | (2006.01) |
| *B60W 10/02* | (2006.01) |
| *B60W 10/08* | (2006.01) |
| *B60L 15/20* | (2006.01) |
| *B60L 11/18* | (2006.01) |
| *B60W 10/107* | (2012.01) |
| *F02N 11/08* | (2006.01) |

(52) U.S. Cl.
CPC ........... *B60L 11/14* (2013.01); *B60L 11/1877* (2013.01); *B60L 15/20* (2013.01); *B60W 10/02* (2013.01); *B60W 10/08* (2013.01); *B60W 10/107* (2013.01); *F02N 11/0851* (2013.01); *B60L 2210/40* (2013.01); *B60L 2220/14* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/485* (2013.01); *B60L 2240/486* (2013.01); *B60W 2710/081* (2013.01); *Y02T 10/6221* (2013.01); *Y02T 10/645* (2013.01); *Y02T 10/70* (2013.01); *Y02T 10/7005* (2013.01); *Y02T 10/705* (2013.01); *Y02T 10/7022* (2013.01); *Y02T 10/7077* (2013.01); *Y02T 10/7241* (2013.01); *Y02T 10/7275* (2013.01); *Y10S 903/93* (2013.01)

(58) Field of Classification Search
CPC ............... B60W 10/26; B60W 20/108; B60W 2710/083; B60W 2540/10; B60W 20/40; B60W 2710/081; B60W 2710/027; B60W 2510/0291; B60W 2510/083; B60W 2710/023; B60W 20/10; B60W 20/102; B60W 20/20; B60W 2710/085; B60W 2510/0275; B60K 6/46; B60K 6/387; B60K 2006/4825; B60K 6/543; B60K 2006/268; B60K 6/42; Y02T 10/6286; Y02T 10/642; Y02T 10/7044; Y02T 10/646; Y10S 903/93; Y10S 903/946; Y10S 903/903; Y10S 903/904; Y10S 903/902; Y10S 903/918
USPC ... 701/22, 54, 67, 68, 69, 84, 101; 477/5, 8, 477/13, 39, 57, 77; 180/65.21, 65.245, 180/65.28, 278, 293
See application file for complete search history.

(56) References Cited

U.S. PATENT DOCUMENTS

| | | | | |
|---|---|---|---|---|
| 6,209,672 | B1* | 4/2001 | Severinsky | B60K 6/442 180/65.23 |
| 6,338,391 | B1* | 1/2002 | Severinsky | B60K 6/442 180/65.23 |
| 7,670,257 | B2* | 3/2010 | Popp | B60K 6/48 477/174 |
| 2001/0039230 | A1* | 11/2001 | Severinsky | B60H 1/004 477/3 |
| 2005/0169765 | A1* | 8/2005 | Ito | B60K 6/445 417/10 |
| 2006/0180130 | A1* | 8/2006 | St. James | F02B 33/40 123/559.1 |
| 2006/0190145 | A1* | 8/2006 | Yamamoto | B60W 10/30 701/22 |
| 2006/0243501 | A1* | 11/2006 | Hidaka | B60K 6/48 180/65.1 |
| 2007/0056783 | A1* | 3/2007 | Joe | B60K 6/48 180/65.265 |
| 2007/0056784 | A1* | 3/2007 | Joe | B60K 6/48 180/65.245 |
| 2007/0080005 | A1* | 4/2007 | Joe | B60K 6/48 180/65.245 |
| 2007/0102205 | A1* | 5/2007 | Yamanaka | B60W 30/186 180/65.1 |
| 2007/0102207 | A1* | 5/2007 | Yamanaka | B60K 6/48 180/65.31 |
| 2007/0102208 | A1* | 5/2007 | Okuda | B60K 6/48 180/65.31 |
| 2007/0221421 | A1* | 9/2007 | Tanishima | B60K 6/365 180/65.245 |
| 2007/0227790 | A1* | 10/2007 | Tanishima | B60K 6/48 180/65.245 |
| 2007/0254776 | A1* | 11/2007 | Wakashiro | B60K 6/48 477/181 |
| 2007/0259755 | A1* | 11/2007 | Tanishima | B60K 6/387 477/3 |
| 2007/0276557 | A1* | 11/2007 | Motosugi | B60K 6/365 701/22 |
| 2007/0278022 | A1* | 12/2007 | Tanishima | B60K 6/383 180/65.285 |
| 2008/0006457 | A1* | 1/2008 | Fujimoto | B60W 10/02 180/65.1 |
| 2008/0058154 | A1* | 3/2008 | Ashizawa | B60K 6/36 477/5 |
| 2008/0091314 | A1* | 4/2008 | Hayashi | B60K 6/48 701/22 |
| 2008/0228363 | A1* | 9/2008 | Kouno | B60K 6/48 701/54 |
| 2008/0275601 | A1* | 11/2008 | Saito | B60K 6/48 701/22 |
| 2009/0143189 | A1* | 6/2009 | Hasegawa | B60K 6/48 477/5 |
| 2009/0143950 | A1* | 6/2009 | Hasegawa | B60K 6/48 701/68 |
| 2009/0166109 | A1* | 7/2009 | Duan | B60K 6/383 180/65.28 |
| 2010/0298092 | A1* | 11/2010 | Tsuchikawa | B60K 6/365 477/71 |
| 2010/0312422 | A1* | 12/2010 | Imaseki | B60K 6/365 701/22 |
| 2011/0021312 | A1* | 1/2011 | Fukitani | B60K 6/48 477/5 |
| 2011/0040434 | A1* | 2/2011 | Kishibata | B60K 6/48 701/22 |
| 2011/0082630 | A1* | 4/2011 | Kawaguchi | F16H 61/0031 701/58 |
| 2011/0165992 | A1* | 7/2011 | Ueno | B60K 6/365 477/9 |
| 2012/0108387 | A1* | 5/2012 | Akebono | B60W 10/02 477/12 |
| 2012/0108388 | A1* | 5/2012 | Akebono | B60W 10/08 477/12 |
| 2012/0109438 | A1* | 5/2012 | Akebono | B60K 6/48 701/22 |
| 2012/0199437 | A1* | 8/2012 | Okuda | B60K 6/48 192/85.63 |
| 2012/0203406 | A1* | 8/2012 | Akebono | B60W 10/02 701/22 |
| 2012/0316715 | A1* | 12/2012 | Suzuki | B60K 6/48 701/22 |
| 2012/0323426 | A1* | 12/2012 | Zhang | B60K 6/387 701/22 |
| 2013/0124027 | A1* | 5/2013 | Tanishima | B60K 6/48 701/22 |
| 2013/0191012 | A1* | 7/2013 | Hirotsu | B60W 10/02 701/113 |
| 2013/0297128 | A1* | 11/2013 | Takamura | B60K 6/48 701/22 |

(56) References Cited

U.S. PATENT DOCUMENTS

2014/0129119 A1* 5/2014 Park ..................... F02N 19/00
                                                                             701/113

FOREIGN PATENT DOCUMENTS

| JP | 2008105494 A | * | 5/2008 |
| --- | --- | --- | --- |
| JP | 2008-179242 A | | 8/2008 |
| JP | 2009-143501 A | | 7/2009 |
| JP | 2009-262749 A | | 11/2009 |
| JP | 2010-241156 A | | 10/2010 |
| WO | 2012/010951 A2 | | 1/2012 |

* cited by examiner

HYBRID VEHICLE DRIVE CONTROL SYSTEM

CROSS-REFERENCE TO RELATED APPLICATIONS

This application is a U.S. National stage application of International Application No. PCT/JP2012/078131, filed Sep. 31, 2012, which claims priority to Japanese Patent Application No. 2011-257979 filed in Japan on Nov. 25, 2011. The disclosure of Japanese Patent Application No. 2011-257979 is hereby incorporated by reference in its entirety.

BACKGROUND

Field of the Invention

The present invention relates to a drive control system for a hybrid electric vehicle which starts an engine using a torque of an electric motor at an engine start request.

Background Information

Conventionally, a drive control system for a hybrid vehicle is known in which, when an engine start torque is not sufficient to start the engine, a transmission is upshifted to reduce a motor rotational speed to thereby increase a motor torque (Japanese Laid-Open Application Publication No. 2008-105494, for example).

SUMMARY

However, it is difficult in such a conventional hybrid vehicle drive control system to sufficiently reduce the motor rotational speed by the shift-up of the transmission in a higher range of motor rotational speed. Thus, there is a limit of the range of motor rotational speeds in which this hybrid vehicle drive control system can be applied. Also, the transmission cannot be shifted up in a certain driving scene such as at engine start up in response to depression of an acceleration pedal.

The present invention has been made in view of the above problem and aims to provide a hybrid vehicle drive control system which can start an engine by a motor torque irrespective of a motor rotational speed or a driving scene.

In order to achieve the above object, the hybrid vehicle control system according to the present invention includes an engine, a motor, a first clutch provided between the engine and the motor, and a second clutch provided between the motor and a drive wheel. The drive control system engages the first clutch upon receipt of an engine start request, and uses the torque of the motor to start the engine. Further, the control system of this hybrid vehicle includes a second clutch control means and a motor rotational speed control means.

The second clutch control means releases or disengages the second clutch in response to an engine start request. The motor rotational speed control means is configured to reduce the motor speed by a rotational speed control of the motor when the second clutch is being disengaged.

The hybrid vehicle drive control system according to the present invention is configured to disengage the second clutch upon an engine start request. Thus, the maximum output torque of the motor will be increased and the engine start using the motor torque is enabled. In other words, a range of decrease by which the motor rotational speed is decreased due to a shifting up of the transmission is decided by a motor rotational speed and a gear or speed ratio. Therefore, at a high motor rotational speed with a small speed ratio, the range of decrease in the rotational speed due to the shift-up is too small to increase the motor torque sufficient for startup of the engine. Further, at a small speed ratio in a scene in which a further decrease in motor rotational speed is not available by shifting up operation, the reduction in motor rotational speed cannot be achieved. In contrast, by decreasing the motor rotational speed by the motor speed, it is possible to decrease the motor rotational speed to the extent at which a torque required for an engine start is available so that the engine start using the motor torque will be achieved, irrespective of a motor rotational speed or a speed ratio. In addition, since the motor rotational speed is controlled regardless of the shift control of the transmission, even in a driving scene in which an upshift is not possible, the engine may be started using the motor torque due to decrease in motor rotational speed. As a result, irrespective of a motor rotational speed or driving scenes, it is possible to start the engine using a motor torque.

BRIEF DESCRIPTION OF THE DRAWINGS

Referring now to the attached drawings which form a part of this original disclosure.

DETAILED DESCRIPTION OF THE EMBODIMENTS

Hereinafter, the embodiments of a hybrid vehicle drive control system according to the present invention will be described based on first and second embodiments with reference to the accompanying drawings.

First Embodiment

First, the configuration of the drive control system is described. The configuration of the control system of a hybrid vehicle is described in an "overall system configuration" and a "configuration of the engine start control process", separately.

Configuration of Essential Part of the Entire System

Figure 1:
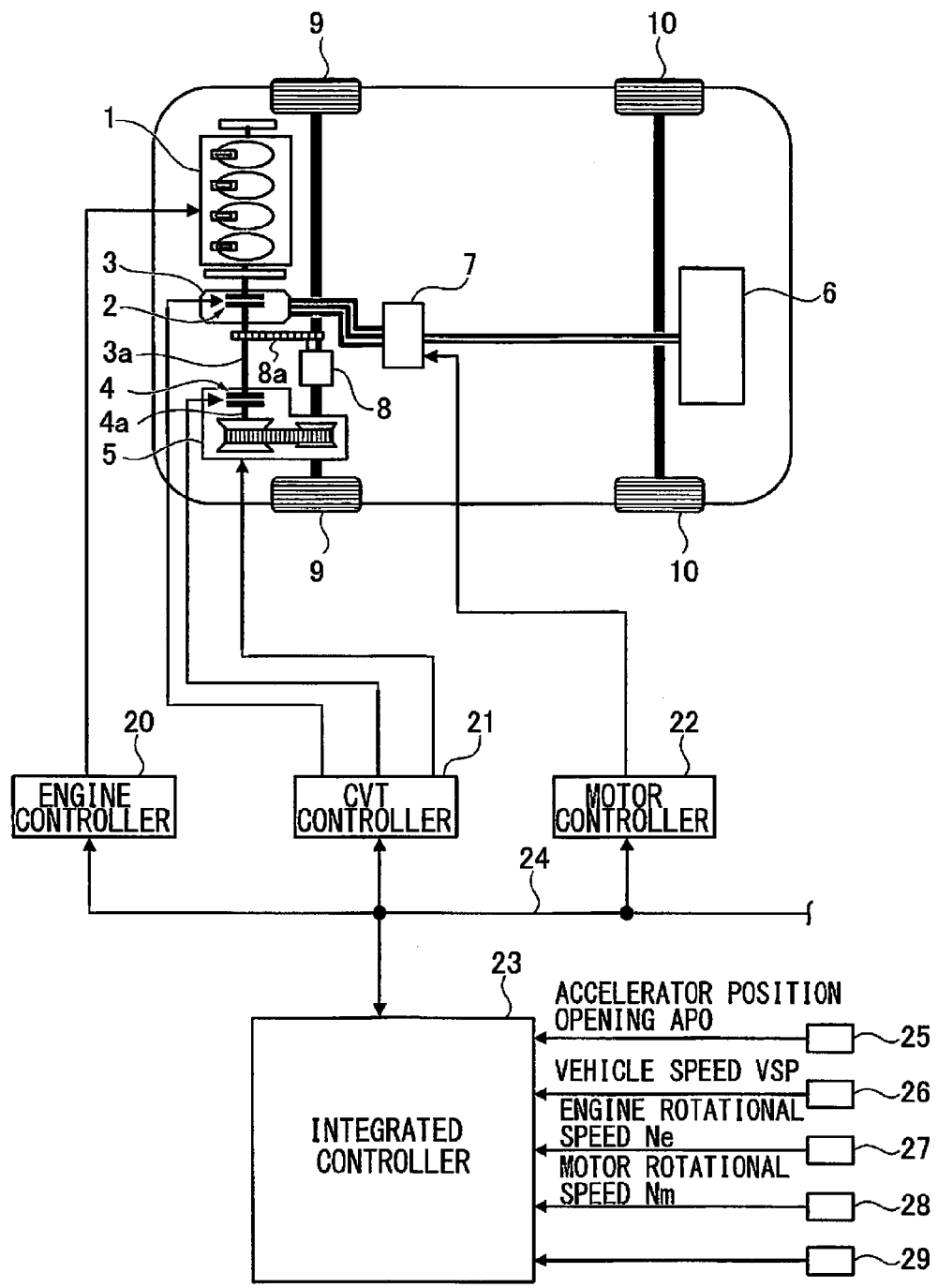
FIG. 1 shows the entire system of an FF hybrid vehicle to which a drive control system according to a first embodiment is applied.

FIG. 1 shows the entire system of an FF hybrid vehicle to which the drive control system according to the first embodiment is applied. The entire system of the FF hybrid vehicle is described below referring to FIG. 1.

As shown in FIG. 1, the FF hybrid vehicle comprises an engine 1, a first clutch 2, a motor/generator 3 (motor), a second clutch 4, a belt type continuously variable transmission (transmission) 5, a high voltage battery 6, an inverter 7, and a mechanical oil pump 8. Front wheels (drive wheel) 9, 9 and rear wheels 10, 10 are also shown.

The engine 1 may be a gasoline engine or diesel engine and is controlled by an engine control command from an engine controller 20 such as to perform an engine start and stop control, a valve opening control of a throttle valve, and a fuel cutoff control.

The first clutch 2 is a clutch interposed between the engine 1 and the motor/generator 3. The clutch is controlled to selectively engage or disengage by a first clutch oil or hydraulic pressure produced by an oil pressure unit (not shown) based on a control command from a CVT controller 21.

The motor/generator 3 is a synchronous motor/generator comprised of a rotor into which permanent magnets are embedded and a stator around which a stator coil is wound. Applied with a three-phase AC current generated by the inverter 7, the motor/generator 3 is driven by a control command from a motor controller 22. The motor/generator 3 operates as an electric motor to rotate by power supply from the high voltage battery 6 via the inverter 7 (driving operation). Also, the motor/generator functions as a generator to generate an electromotive power at both ends of the stator coil when the rotor thereof receives rotational energy from the engine 1 or through right and left front wheels 9, 9, to thereby charge the high voltage battery 6 via the inverter 7 (regeneration operation).

The second clutch 4 is interposed between the motor/generator 3 and the left and right front wheels 9, 9, and specifically between a motor shaft 3a and a transmission input shaft 4a. The second clutch 4 is selectively controlled among an engagement, slip-engagement, and disengagement by a second clutch hydraulic pressure produced by a hydraulic unit (not shown) based on the control command from the CVT controller 21.

The belt type continuously variable transmission 5 is disposed at downstream of the second clutch 4 and has a continuously variable transmission function to set the speed ratio steplessly and continuously. The speed ratio represented by a ratio of two diameters with which a belt are wound around two pulleys respectively is subject to control by a primary oil pressure and secondary oil pressure produced by the oil pressure unit (not shown) according to a control command from the CVT controller 21. A transmission output shaft of the belt type continuously variable transmission 5 is coupled with a differential (not shown), and the differential in turn is connected with the right and left front wheels 9, 9 via right and left drive shafts.

Figure 2:
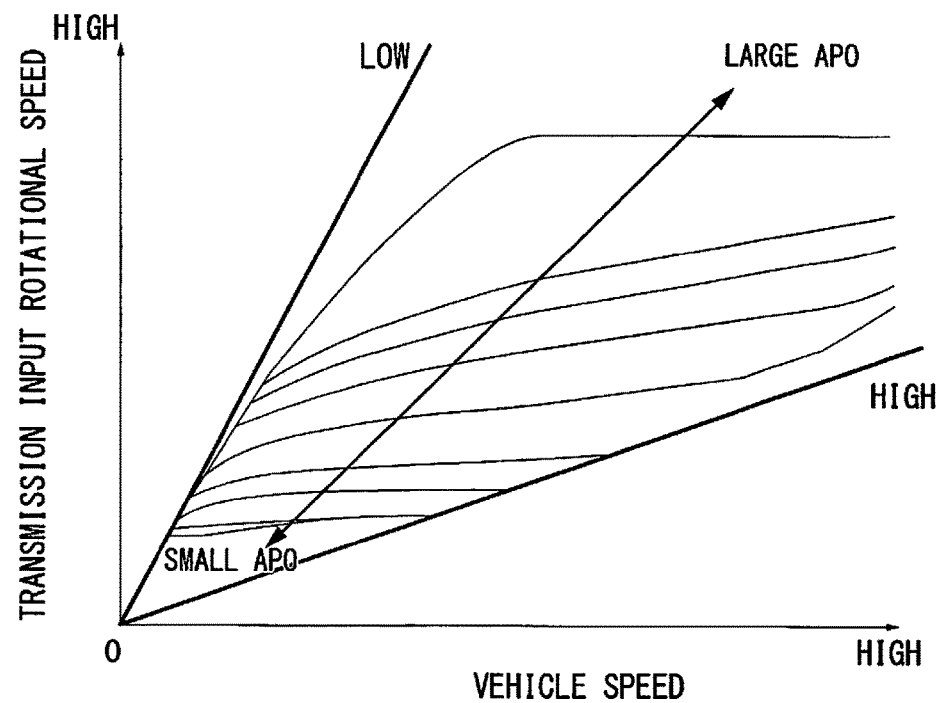
FIG. 2 shows an example of a diagram of the gear shift of a belt type continuously variable transmission mounted in the FF hybrid vehicle to which the drive control system according to the first embodiment is applied.

FIG. 2 shows an example of a shift diagram the belt type continuously variable transmission 5. In this shift diagram, when the abscissa axis indicates a vehicle speed while the longitudinal axis indicates a transmission input rotational speed (=motor rotational speed), both the vehicle speed and the transmission input rotational speed may be determined for each accelerator pedal position. The left one of two upward straight lines represents a lowest speed ratio while the right straight line represents a highest speed ratio. The speed ratio of the belt type continuously variable transmission 5 falls somewhere between these two straight lines, and is specifically determined based on the accelerator pedal position, the vehicle speed, and the transmission input rotational speed.

The inverter 7 converts a direct current from the high voltage battery 6 into a three-phase AC current according to a control command from the motor controller 22 to drive the motor/generator 3 during the driving mode of operation. Further, during the regenerative operation, the inverter 7 is operative to convert the three-phase AC current from the motor/generator 3 to the direct current to charge the high voltage battery 6.

The mechanical oil pump 8 operates by the rotational driving force of the motor shaft 3a as an output shaft of the motor/generator 3 and is of a type of gear pump or vane pump, for example. Here, at upstream of the second clutch 4, a pump input gear is connected to a pump gear attached to the motor shaft 3a via a chain 8a. That is, the discharge rate of the mechanical oil pump 8 changes in accordance with the rotational speed of the motor/generator 3 (motor rotational speed Nm). Further, the operation oil discharged from the mechanical oil pump 8 is supplied to an oil pressure unit (not shown) to generate a necessary oil pressure to thereby operate the first clutch 2, second clutch 4, and belt type continuously variable transmission 5.

The FF hybrid vehicle comprises different driving modes, i.e., an electric vehicle mode (hereinafter, referred to as an EV mode), a hybrid vehicle mode (hereinafter, referred to as a HEV mode), and a drive torque control mode (hereinafter, referred to as a WSC mode).

In the EV mode, the first clutch 2 is disengaged and the vehicle runs using the engine 1 and the motor/generator 3 as a drive power source. It includes a motor driving mode and a regeneration driving mode. The EV mode is selected when a drive power requested is low and a battery SOC is secured.

In the HEV mode, with the first clutch 2 engaged, the vehicle runs using the engine 1 and the motor/generator 3 as a drive power source. It includes a motor assist driving mode, a generation driving mode, and an engine driving mode. The HEV mode is selected when a high drive power is requested or the battery SOC is insufficient.

In the WSC mode, the second clutch 4 is maintained in a slip-engagement state by the rotational speed control of the motor/generator 3 while the torque passing through the second clutch 4 is controlled to meet a required drive torque that is determined by a vehicle condition or a driver's operation. The WSC mode is selected with the HEV mode being selected and a driving range where an engine rotational speed will lower than an idling rotational speed such as in a vehicle stopped state, a starting state, or deceleration state.

The drive control system of the FF hybrid vehicle comprises the engine controller 20, the CVT controller 21, motor controller 22, and integrated controller 23 as shown in FIG. 1. The controllers 20, 21, 22 are connected through a CAN communication line 24 with the integrated controller 23 for exchanging data mutually.

The engine controller 20 receives engine rotational speed information from an engine rotational speed sensor 27, a target engine torque command from the integrated controller 23, and other necessary information. The engine controller 20 outputs a command for controlling an engine operation point (Ne, Te) to a throttle valve actuator of the engine 1 and the like.

The CVT controller 21 receives information from an accelerator pedal position sensor 25, a vehicle speed sensor 26, and other sensors 29. During vehicle running with a D range being selected, a target input rotational speed is searched for, which is determined by an accelerator position opening APO and a vehicle speed VSP in the shift map, and a control command to achieve the identified target input rotational speed (speed ratio) will be output to a hydraulic unit provided in the belt type continuously variable transmission 5. The CVT controller 21 controls the oil pressures of the first clutch 2 and the second clutch 4 in addition to this speed ratio control.

The motor controller 22 receives information on the rotational position of the rotor, a motor rotational speed sensor 28, a target MG torque command and a target MG rotational speed command from the integrated controller 23 and other necessary information, and outputs a control command for the motor operation point (Nm, Tm) of the motor/generator 3 to the inverter 7.

The integrated controller 23 functions to manage the energy consumption of the entire vehicle and drive the vehicle most efficiently. The integrated controller 23, directly or via the CAN communication line 24, receives necessary information from the accelerator position sensor 25, the vehicle speed sensor 26, the engine rotational speed sensor 27, the motor rotational speed sensor 28, and other sensors and switches (for example, an oil rate sensor 29 to detect the operation oil amount supplied to the belt type continuously variable transmission 5). Further, the integrated controller 23 includes a mode selector to find an optimal driving mode according to the position of drive point (APO, VSP) decided by the accelerator position and the vehicle speed in the EV-HEV selection map in FIG. 3 and selects the driving mode as a target driving mode. In the EV-HEV selection map, an EV→HEV switch line (=engine start line), a HEV→EV switch line (=engine stop line), and a HEV→WSC switch line are set, respectively. The mode selector switches the target driving mode from the EV mode to the HEV mode when the drive point (APO, VSP) crosses the EV→HEV switch line from the EV area. It switches the target driving mode from the HEV mode to the EV mode when the drive point (APO, VSP) crosses the HEV→EV switch line from the HEV area. Moreover, it switches the target driving mode from the HEV mode to the WSC mode when the drive point (APO, VSP) crosses the HEV→WSC switch line to enter the WSC area with the HEV mode being selected. Note that the HEV→EV switch line and EV→HEV switch line. Both dividing the EV area and the HEV area are configured with a hysteresis amount added. The HEV→WSC switch line is set along a first vehicle speed VSP1 at which the engine 1 can maintain the idling rotational speed while the belt type continuously variable transmission 5 is in a predetermined low speed ratio range. However, when the battery SOC decreases to a predetermined value or less in the EV mode, the HEV mode is forcibly employed as the target driving mode. When the mode selector selects the HEV mode as the target driving mode during the "EV mode", the integrated controller 23 controls to shift to the HEV mode through an engine start control process or operation. This engine start control operation starts upon output of an engine start request when the drive point (APO, VSP) crosses the EV-HEV switch line (=engine start line) in FIG. 3 during the "EV mode".

Configuration of Engine Start Control Operation

Figure 4:
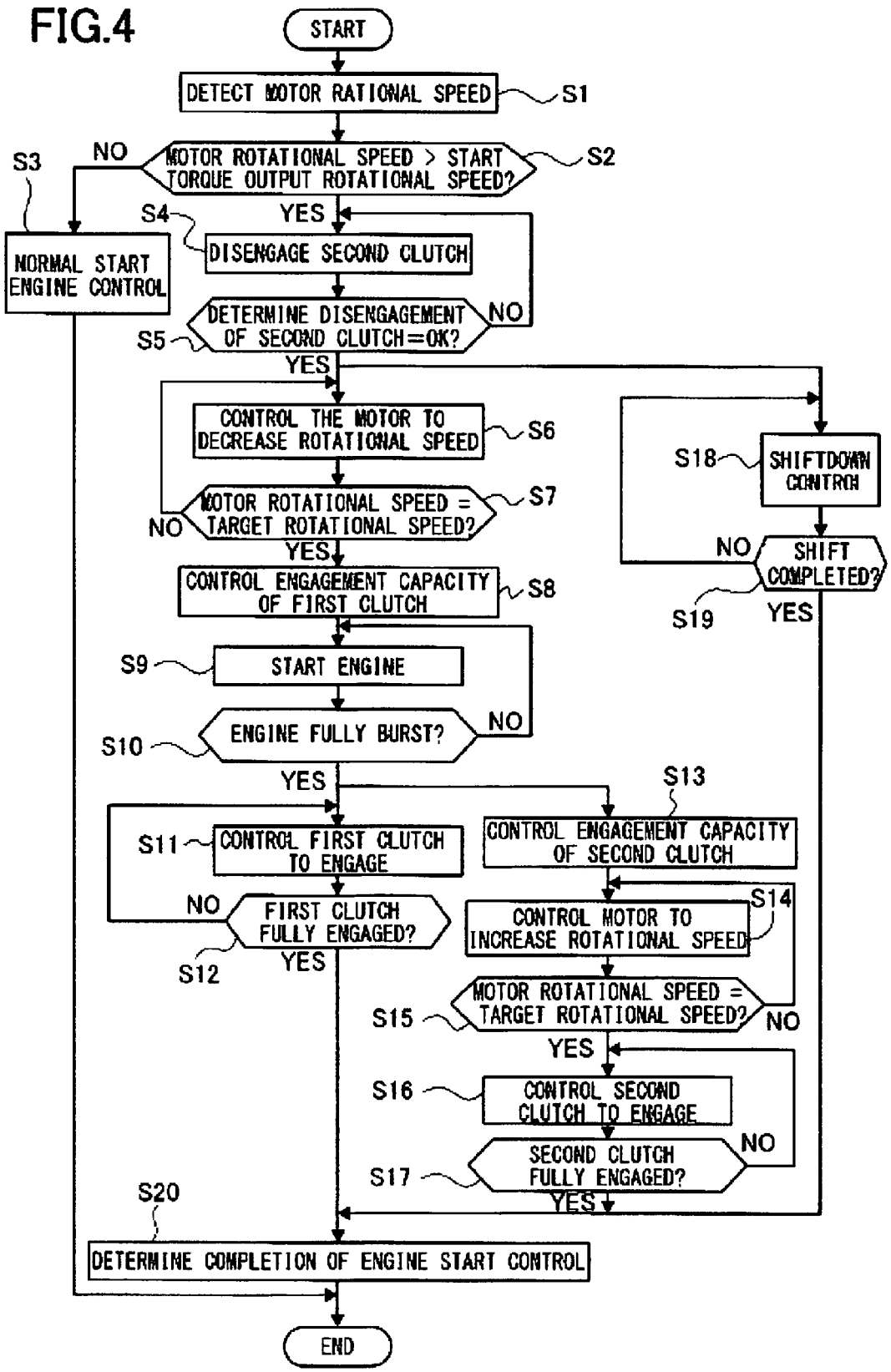
FIG. 4 is a flowchart for the engine start control process executed by the integrated controller of the FF hybrid vehicle to which the drive control system according to the first embodiment is applied.

FIG. 4 is a flowchart for the engine start control operation of the integrated controller of the FF hybrid vehicle to which the drive control system according to the first embodiment is applied. Each step in FIG. 4 is described below.

In step S1, along with the output of engine start request, the motor rotational speed sensor 28 detects the output rotational speed of the motor/generator 3 (hereinafter, referred to as a motor rotational speed Nm). The control proceeds to step S2.

Figure 5:
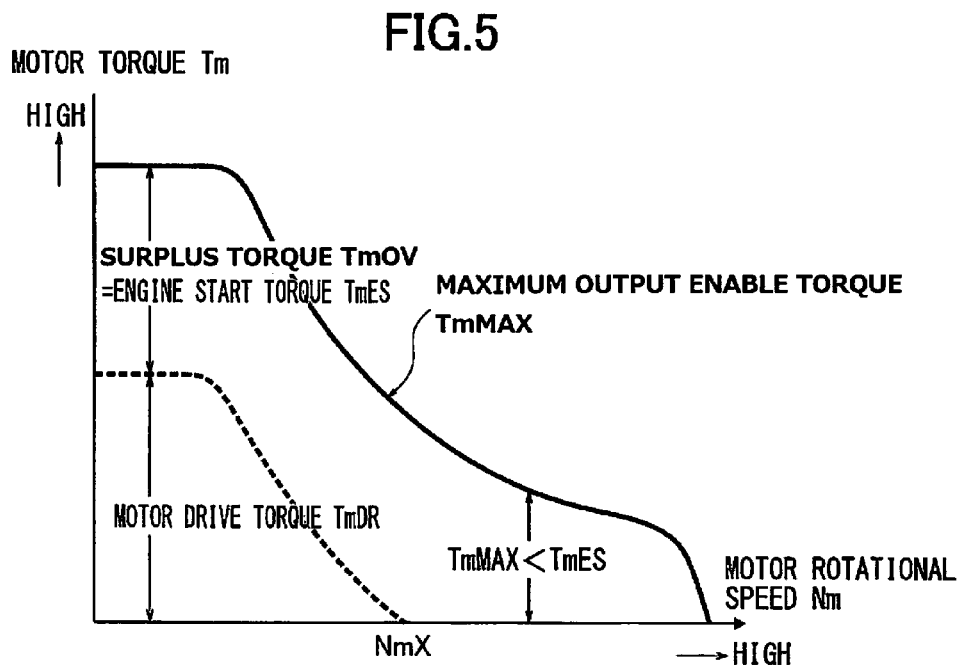
FIG. 5 shows an example of a diagram of the characteristic of the maximum output torque capacity relative to the motor rotational speed of the motor/generator.

In step S2, following the detection of the motor rotational speed Nm in step S1, a determination is made on whether or not the motor rotational speed Nm exceeds a start torque output rotational speed NmX, i.e., the rotational speed which assures to output a starting torque. If YES (Nm>NmX), the motor/generator 3 is determined not to have a surplus torque needed for the engine startup, and the control proceeds to step S4. With NO (Nm≤NmX), the motor/generator 3 is determined to have the extraneous torque needed for the engine startup, and the control proceeds to step S3. Herein, the "start torque output rotational speed NmX" is the maximum rotational speed of the motor/generator 3 to attain the engine start torque TmES necessary for the engine to startup by the extraneous torque TmOV, which is obtained by subtracting motor drive torque TmDR for use of travel of the vehicle from the maximum output enable torque TmMAX of the motor/generator 3, as shown in FIG. 5. That is, the drive characteristics of the motor/generator 3 are such that the maximum output enable torque TmMAX decreases as the motor rotational speed Nm increases from a certain motor rotational speed. Thus, at a motor rotational speed Nm higher than the start torque output rotational speed NmX, the motor/generator 3 cannot start the engine since the maximum output enable torque TmMAX is smaller than the engine start torque TmES.

In step S3, following the determination in step S2, i.e., Nm≤NmX (sufficient extraneous torque available for the engine startup), the normal engine start control is executed and the control ends. Herein, in the normal engine start control, the second clutch 4 is slip-engaged first. Then, the first clutch 2 is brought to be half-engaged from the disengaged state in the EV driving mode, and the engine 1 is cranked using the motor/generator 3 as a starter motor. Then, the engine 1 is driven by a fuel injection and an ignition, and the first clutch 2 is fully engaged. After confirming the full engagement of the first clutch 2, the second clutch 4 is fully engaged, and the normal engine start control is completed.

In step S4, following the determined in step S2, Nm>NmX (lacks extraneous torque necessary for the engine startup), the second clutch 4 is disengaged, and control proceeds to step S5. The step S4 corresponds to a second clutch control means to disengage the second clutch 4.

In step S5, following the disengagement of the second clutch in step S4, a determination is made on whether or not the second clutch 4 is fully disengaged at a required level. With YES (sufficient disengagement), the control proceeds to steps S6 and S18 while with NO (insufficient disengagement), the control returns to step S4. Here, the second clutch 4 is determined to be disengaged when the oil pressure of the second clutch reaches a value (clutch disengage value) which places the second clutch 4 in a disengaged state at a required level. Further, the "disengaged state at a required level" is defined such that the torque transmission path between the motor/generator 3 and right and left front wheels 9, 9 is determined to be disconnected. It can be a fully disengaged state or a slip-engaged state.

Figure 6:
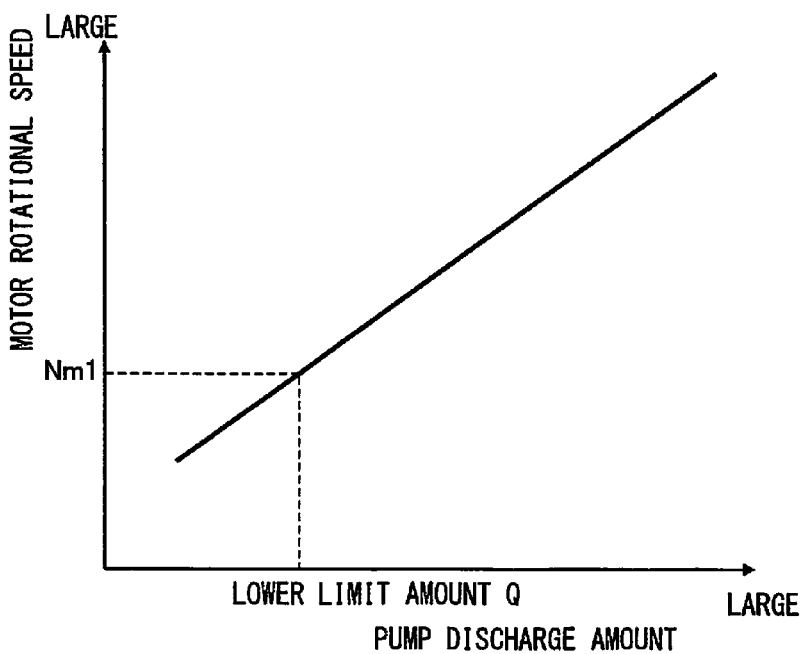
FIG. 6 shows an example of a diagram of the characteristic of discharge amount relative to the motor rotational speed.
Figure 7:
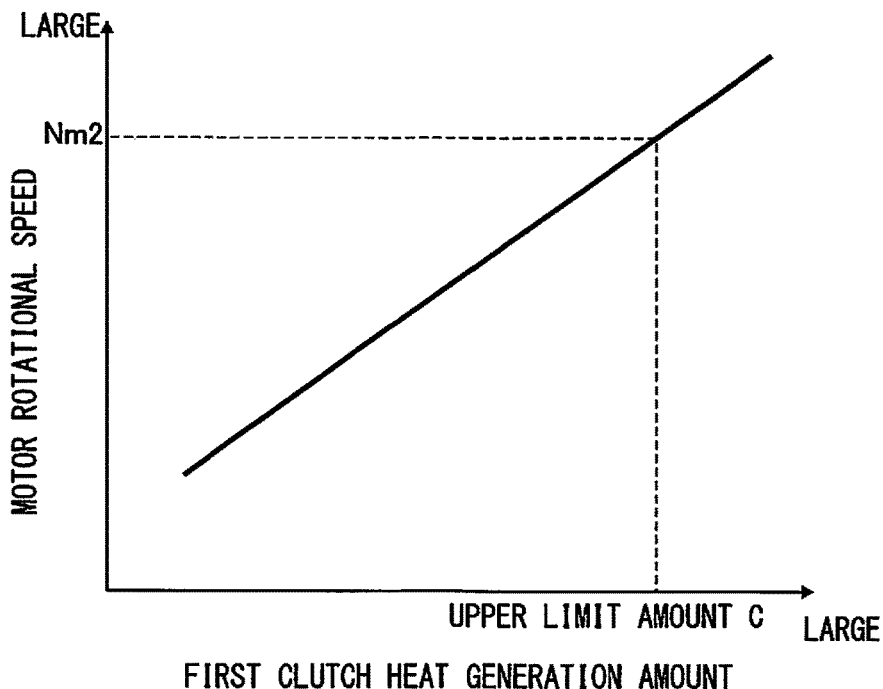
FIG. 7 shows an example of a diagram of the characteristic of the heat generation amount of the first clutch relative to the motor rotational speed.

In step S6, following the determination on disengagement of the second clutch in step S5, the motor rotational speed Nm of the motor/generator 3 is controlled to decrease, and control proceeds to step S7. The step S6 corresponds to a motor rotational speed control means to control the motor/generator 3 to decrease the motor rotational speed Nm and increase the maximum output enable torque TmMAX of the motor/generator. The motor rotational speed Nm is reduced to a target rotational speed where the value at which the engine start torque TmES can be attained, the discharge amount of the mechanical oil pump 8 becomes a lower limit amount or more, and the heat generation amount of the first clutch 2 becomes an upper limit amount or less. Here, the "value at which the engine start torque TmES can be attained" is a motor rotational speed at which the maximum output enable torque TmMAX is increased along with decrease in the motor rotational speed Nm to generate the surplus torque TmOV sufficient to attain the engine start torque TmES. Further, the "value at which the discharge amount or rate of the mechanical oil pump 8 becomes a lower limit amount or more" is a motor rotational speed at which an operation oil amount necessary for the operation of relevant elements such as the first clutch 2 can be attained. Specifically, the mechanical oil pump 8 is operated by the rotational driving force of the output shaft of the motor/generator 3 and increases the oil discharge amount in proportion to increase in the motor rotational speed Nm as shown in FIG. 6. Meanwhile, the first clutch 2 and other elements are operated by the operation oil from the mechanical oil pump 8 and a required discharge amount Q (=lower limit amount) for their operation is preset. Thus, the "value at which the discharge amount of the mechanical oil pump 8 becomes a lower limit amount or more" corresponds to Nm1 or more, at which the discharge amount of the mechanical oil pump 8 becomes the lower limit amount Q. Further, the "value at which the heat generation amount of the first clutch 2 becomes an upper limit amount or less" represents a motor rotational speed at which the heat generation amount of the first clutch 2 can be prevented from being extremely large and thus causing a shorter life. More specifically, at the time of engine start control, the rotational speed of the engine 1 is zero. Thus, the higher the motor rotational speed Nm rotates, the larger the rotational speed differential will be across the first clutch 2 interposed between the engine 1 and the motor/generator 3. Therefore, the heat generation amount of the first clutch 2 increases in proportion to increase in the motor rotational speed Nm, as shown in FIG. 7. On the other hand, with excessive heat generation of the first clutch 2, since the lifetime of the clutch will be reduced, a heat generation amount required for securing a lifetime (=upper limit generation amount) C is previously set. Thus, the "value at which the heat generation amount of the first clutch 2 becomes an upper limit amount or less" is a value equal to or less than Nm2 at which the heat generation amount of the first clutch 2 becomes the upper limit amount C. In the present embodiment, the relation, Nm2>Nm1, is set. The engine start torque TmES can thus be attained at the target rotational speed which is set to a value between Nm1 and Nm2.

In step S7, following the motor rotational speed control in step S6, a determination is made on whether or not the motor rotational speed Nm has reached the target rotational speed. With YES (Nm=target rotational speed), control proceeds to step S8 while, if NO (i.e., Nm≠target rotational speed), control returns to step S6. Whether the motor rotational speed Nm has reached the target rotational speed or not is determined on the basis of a result of detection of the motor rotational speed sensor 28.

In step S8, following Nm=target rotational speed determined in step S7, the engagement capacity of the first clutch 2 is controlled and control proceeds to step S9. The first clutch 2 is half-engaged to transmit the engine start torque TmES from the motor/generator 3 to the engine 1.

In step S9 following the first clutch control in step S8, the engine 1 is driven by fuel injection and ignition. The flow proceeds to step S10.

In step S10, following the engine start in step S9, a determination is made on whether or not the engine 1 reaches a fully burst or complete combustion state. With YES (fully burst or complete combustion), control proceeds to steps S11 and S13 while with NO (incomplete burst or combustion), control returns to step S9.

In step S11, following the engine complete combustion determined in step S10, the first clutch 2 is controlled to be engaged and control proceeds to step S12.

In step S12, following the first clutch engaging control in step S11, a determination is made on whether or not the first clutch 2 is fully engaged. With YES (first clutch engaged), control proceeds to step S20 while, with NO (first clutch not yet engaged), control returns to step S11. In the present embodiment, the engagement of the first clutch 2 is determined based on the oil pressure of the first clutch. That is, the first clutch is determined to be fully engaged when the oil pressure has reached a prescribed value.

In step S13 following the complete engine combustion state determined in step S10, the engagement capacity of the second clutch 4 is controlled and control proceeds to step S14. The second clutch 4 is half-engaged to transmit a requested drive torque from the motor/generator 3 to the right and left front wheels 9, 9.

In step S14, following the second clutch control in step S13, the rotational speed Nm of the motor/generator 3 is controlled to increase, and control proceeds to step S15. The motor rotational speed Nm is increased to a target rotational speed which is obtained according to the speed ration, the vehicle speed based on the shift diagram (FIG. 2) after the shift down operation.

In step S15, following the motor rotational speed control in step S14, a determination is made on whether or not the motor rotational speed Nm has reached the target rotational speed. With YES (Nm=target rotational speed), control proceeds to step S16. With NO (Nm≠target rotational speed), control returns to step S14. Whether or not the motor rotational speed Nm has reached the target rotational speed is determined on the basis of the result of detection of the motor rotational speed sensor 28.

In step S16, following the determination, Nm=target rotational speed, in step S15, the second clutch 4 is controlled to be engaged and control proceeds to step S17.

In step S17, following the second clutch engaging control in step S16, a determination is made on whether or not the second clutch 4 is fully engaged. With YES (second clutch engaged), control proceeds to step S20 while, with No (second clutch not yet engaged), control returns to step S16. The second clutch 4 is determined to be engaged from the oil pressure of the second clutch. When the oil pressure has reached a prescribed value, the second clutch 4 is determined to be fully engaged.

In step S18, following the determination of full disengagement of the second clutch in step S5, the belt type continuously variable transmission 5 is shifted down or controlled to have a larger speed or gear ratio, and control proceeds to step S19. After the shift control, the speed ratio is set arbitrarily in accordance with a requested driving force and the engine torque after the engine startup. Note that the step S18 corresponds to a gear shift control means which is configured to shift down the belt type continuously variable transmission 5 while the second clutch 4 is being disengaged upon the engine start request in step S4.

In step S19, following the execution of the shift control in step S18, a determination is made on whether or not the shift control has been completed or concluded. With YES (shift concluded), control proceeds to step S20, while NO (shift incomplete), control returns to step S18. The completion or conclusion of shifting is determined on the basis whether or not the rotational speed of the transmission input shaft 4a representing the rotational speed of the primary pully has reached a target rotational speed predetermined in accordance with a speed ratio set. That is, when the rotational speed of the transmission input shaft 4a has reached a target rotational speed, the completion of the transmission is determined.

In step S20 following the full engagement of the first clutch determined in step S12, the full engagement of the second clutch determined in step S17, and the completion of the shift operation determined in step S19, the engine start control is determined to be completed, and control proceeds to end.

Next, the operation of the hybrid vehicle drive control system according to the first embodiment is described. First, the problem in the engine start by the drive motor is described. Then, the engine start operation with insufficient start torque, gear shift control operation, and normal engine start operation of the drive control system are separately described.

Problem at Engine Start Using Drive Motor

In the hybrid vehicle comprising the driving system including an engine, a motor, a first clutch between the engine and motor, and a second clutch between the motor and drive wheel, upon receipt of an engine start request, generally, the first clutch is normally engaged and the engine is started by using a surplus, excessive torque TmOV which is a resultant obtainable by subtracting the motor drive torque TmDR from the maximum motor output enable torque TmMAX. In other words, the motor representing a drive source for vehicle propulsion (drive motor) is used as a cranking motor. Thus, in the EV mode in which the vehicle runs using the motor as drive source, the motor drive torque TmDR is limited so as to secure the surplus or excess torque TmOV to be used for the engine start torque TmES.

Thus, the start torque output enabling rotational speed NmX at which the surplus torque TmOV becomes smaller than the engine start torque TmES and the engine cannot be started by the motor represents the motor rotational speed limit in the EV mode. That is, when the motor rotational speed Nm reaches the start torque output enabling rotational speed NmX, an engine start request is issued and control will be switched to the HEV mode.

Meanwhile, there is a hybrid vehicle drive control system to shift up the transmission to reduce the motor rotational speed Nm and increase the motor excess or surplus torque TmOV.

At a constant vehicle speed, the motor rotational speed Nm decreases by shifting up the transmission. Meanwhile, the motor has drive characteristics that the maximum output enable torque TmMAX decreasing along with the increase in the motor rotational speed Nm as shown in FIG. 5. Therefore, the lower the motor rotational speed Nm, the larger the maximum output enable torque TmMAX and the larger the surplus or extraneous torque TmOV.

However, in a high range of motor rotational speed Nm (for example, at the start torque output enabling rotational speed NmX or more), the amount of decrease in the maximum output enable torque TmMAX relative to the amount of increase in the rotational speed is smaller than in a low rotational speed range (for example, less than the start torque output enabling rotational speed NmX). Therefore, the maximum output enable torque TmMAX cannot be sufficiently increased by reducing the motor rotational speed Nm in the high range so that it is difficult to acquire the surplus torque TmOV necessary for the engine startup.

In addition, the amount of decrease in the motor rotational speed Nm accompanied by the shift-up of the transmission is limited by the speed or gear ratio. Accordingly, it is further difficult to reduce the motor rotational speed Nm until the extraneous torque TmOV necessary for the engine startup is acquired. Moreover, in the high motor rotational speed range, generally, the speed ratio of the transmission is set to a small value so that it may be not possible to further up-shift the transmission. When the motor rotational speed Nm cannot be reduced by the shift up, the extraneous torque TmOV cannot be increased accordingly. This causes a problem that the engine start torque TmES cannot be practically acquired in a high motor rotational speed range.

Figure 8:
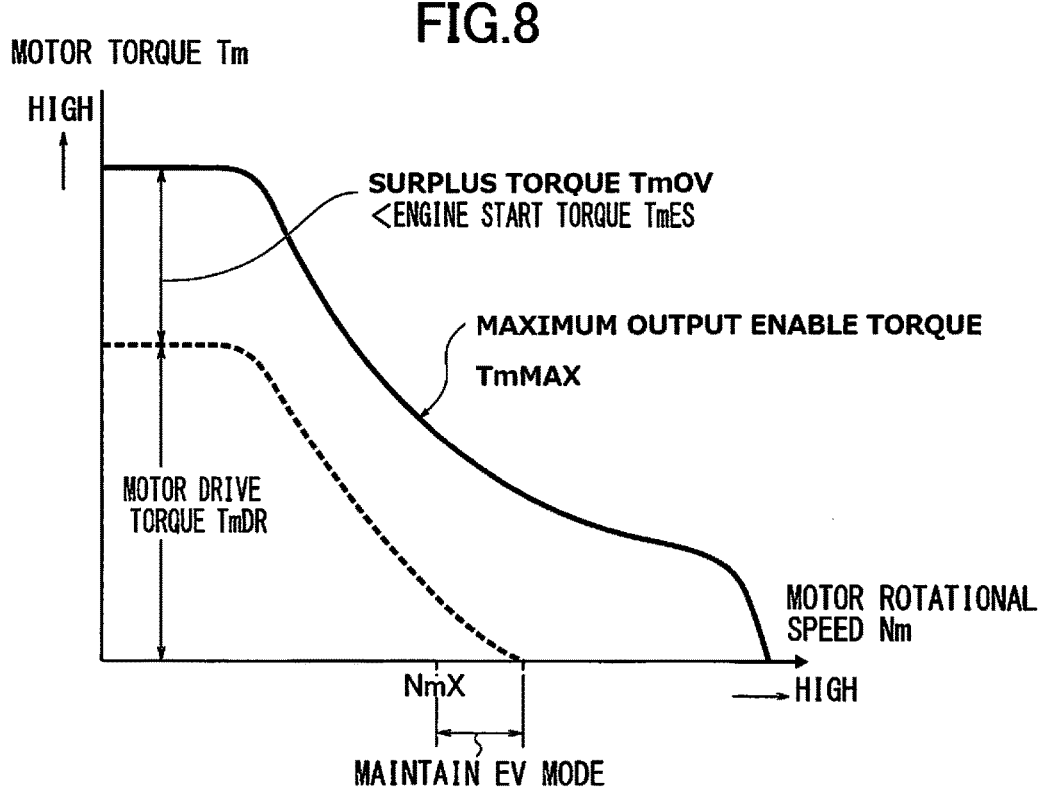
FIG. 8 shows a relation between the motor rotational speed and the motor torque in the engine start control of a comparative hybrid vehicle drive control system.

Further, in order for the engine start torque TmES to be achieved even in the high motor rotational speed range, it is assumed that, by setting the extraneous torque TmOV to the engine start torque TmES or less, the motor drive torque TmDR is secured even in the high rotational speed range (equal to or over NmX) as shown in FIG. 8.

In this case, another problem occurs in that, upon issuance of an engine start request, the engine start torque needs to be acquired by reducing the motor drive torque TmDR and thus increasing the surplus torque TmOV.

Engine Start Operation with Insufficient Start Torque

Figure 9:
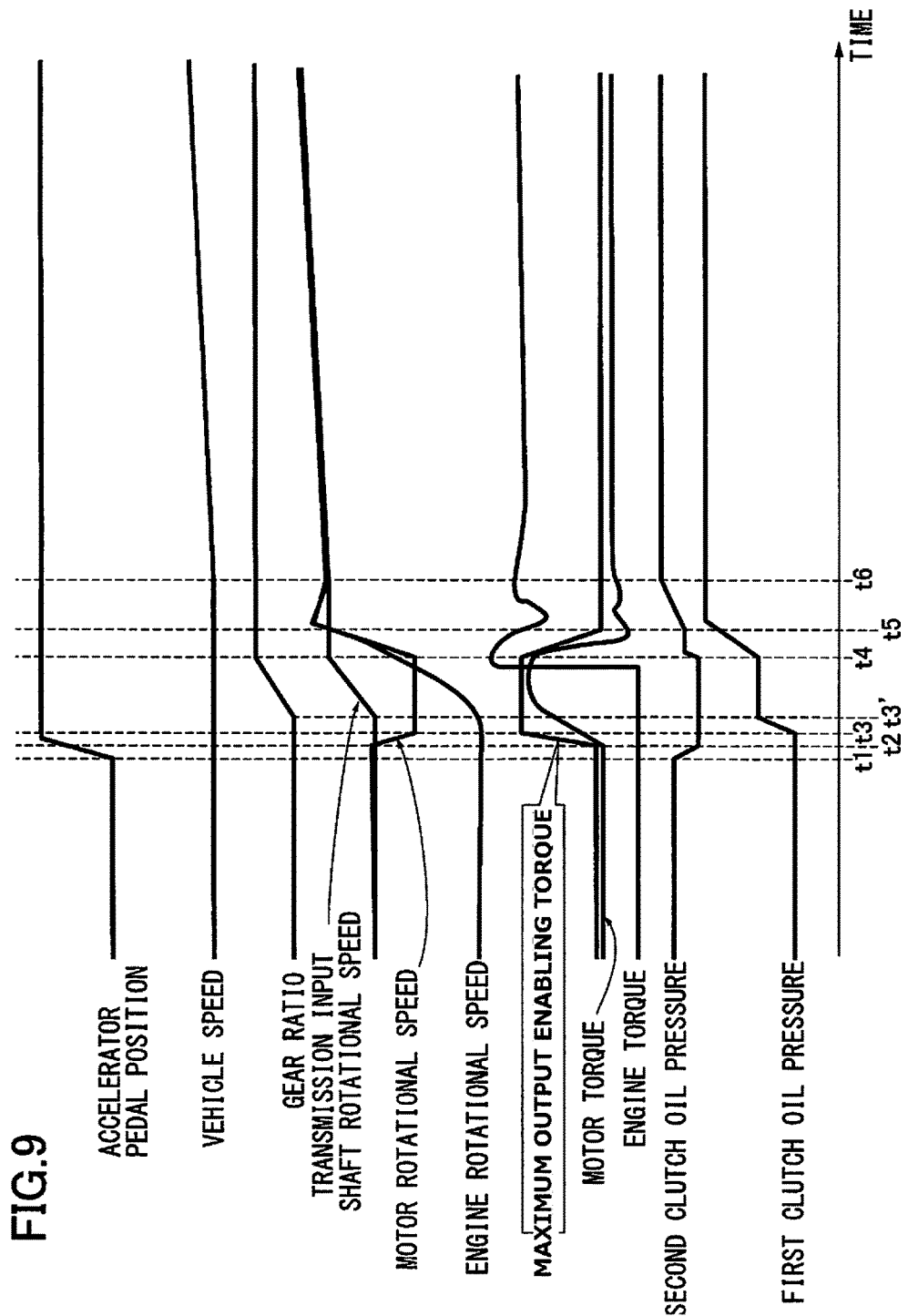
FIG. 9 is a timing chart of the respective characteristics of accelerator pedal position, vehicle speed, gear ratio, rotational speed of transmission input shaft, motor rotational speed, engine rotational speed, motor torque, maximum output torque capacity, engine torque, second clutch oil pressure, and first clutch oil pressure in the engine start control according to the first embodiment.
Figure 10:
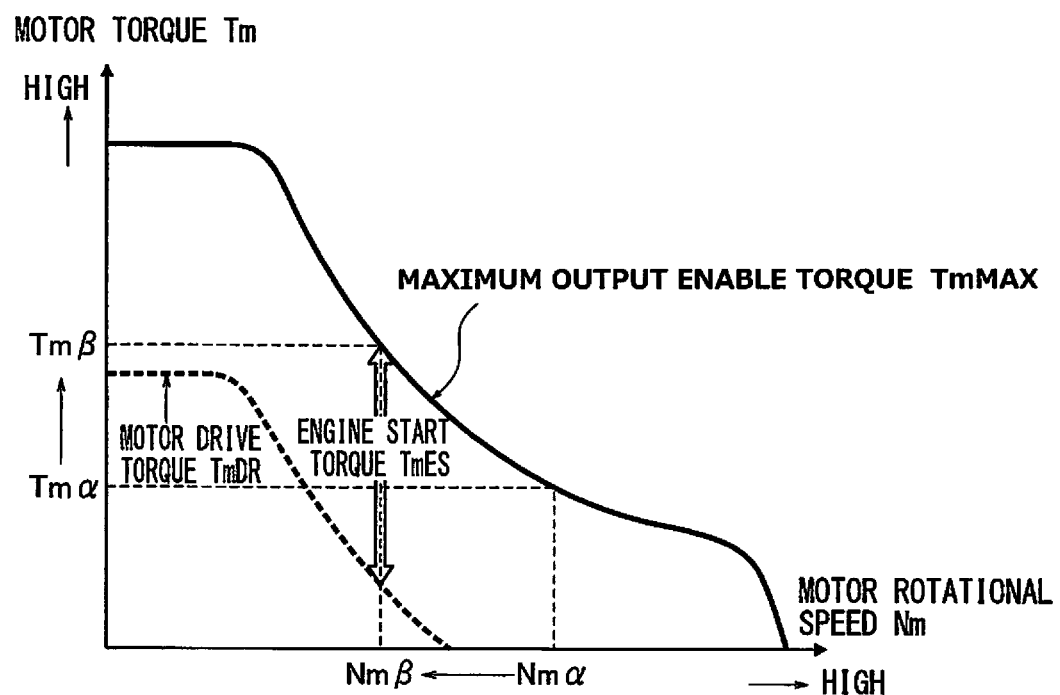
FIG. 10 shows a relation between the motor rotational speed and the motor torque in the engine start control according to the first embodiment.

FIG. 9 is a timing chart of the characteristics of an accelerator position, a vehicle speed, a speed ratio, a rotational speed of transmission input shaft, a motor rotational speed, an engine rotational speed, a motor torque, a maximum output torque, an engine torque, a second clutch oil pressure, and a first clutch oil pressure, respectively, during the engine start control according to the first embodiment. FIG. 10 shows a relation between the motor rotational speed and the motor torque in the engine start control according to the first embodiment.

Figure 3:
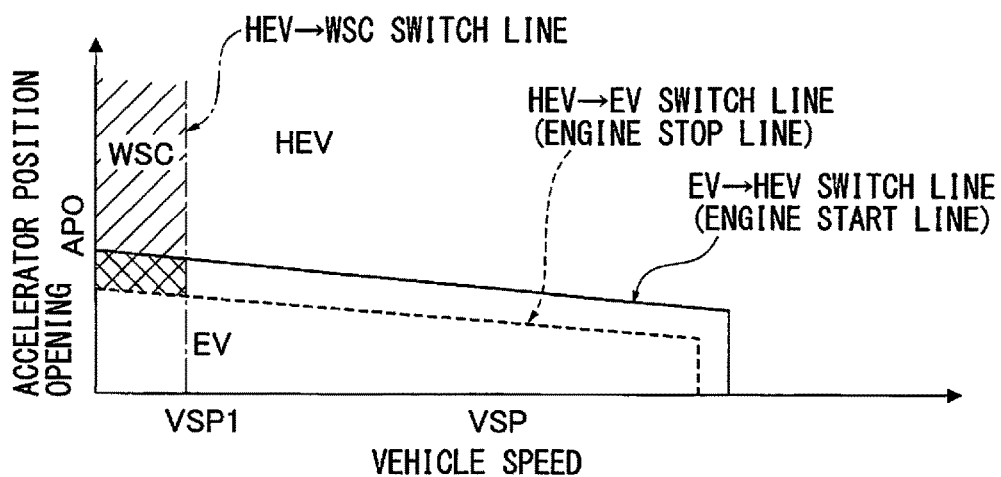
FIG. 3 shows an example of an EV-HEV selection map set in a mode selector of the integrated drive control system in the first embodiment.

At time t1 in FIG. 9, when the accelerator is stepped on until the drive point (APO, VSP) in the EV range crosses the EV→HEV switch line (=engine start line) in the EV-HEV selection map in FIG. 3, an engine start request is output.

Thus, control proceeds from step S1 to step S2 in the flowchart in FIG. 4 and a determination is made on whether or not the motor rotational speed Nm exceeds the start torque output rotational speed NmX. When the motor rotational speed Nm is high (Nmα in FIG. 10, for example) and the engine start torque TmES cannot be obtained by the surplus torque TmOV, control proceeds to step S4 to control the second clutch 4 to disengage. Thus, from time t1 on, the second clutch oil pressure starts decreases.

At time t2 the second clutch oil pressure reaches a disengage value and the second clutch 4 is disengaged. Control proceeds from step S5 to step S6 to control the motor/generator 3 to decrease the motor rotational speed Nm. That is, in FIG. 10 the motor rotational speed Nm gradually decreases from Nmα to Nmβ.

At this time, since the second clutch is being controlled to be disengaged, the torque transmission path between the motor/generator 3 and the belt type continuously variable transmission 5 is disconnected. Thus, all the motor torque Tm from the motor/generator 3 can be used for the engine start torque TmES. Also, a torque variation or a rotational speed variation in the motor/generator 3 or the engine 1 is not transmitted to the right and left front wheels 9, 9.

Due to the drive characteristics of the motor/generator 3 that the maximum output enable torque TmMAX decreases with increase in the motor rotational speed Nm, the maximum output enable torque TmMAX is increased by reducing the motor rotational speed Nm. That is, the maximum output enable torque TmMAX increases to assume from Tmα to Tmβ in FIG. 10.

Here, the target motor rotational speed Nm (Nmβ in FIG. 10, for example) when reducing the motor rotational speed Nm represents a value that may secure the engine start torque TmES and a value at which the delivery rate of the mechanical oil pump 8 amount to the lower limit flow rate Q or more. Also, the value is set such that the heat generation of the first clutch 2 is equal to or less than the upper limit heat generation amount C.

The engine start torque TmES can be acquired by the extraneous torque TmOV by setting the motor target rotational speed of the motor rotational speed Nm to the value that secures the engine start torque TmES. That is, in FIG. 10, while the motor rotational speed Nm is Nmα, the maximum output enabling torque TmMAX (Tmα) is smaller than the engine start torque TmES so that the engine cannot be started by maintaining the motor rotational speed Nm as Nmα. In contrast, when the motor rotational speed Nm is Nmβ, the maximum output enabling torque TmMAX (Tmβ) is large enough to secure the engine start torque TmES by the surplus torque Tm0V. Thus, by reducing the motor rotational speed Nm to Nmβ, engine can be started by the motor torque Tm. Further, in the first embodiment, the motor rotational speed Nm is controlled to be reduced to a necessary rotational speed. Thus, even with the motor rotational speed at a high rotational speed range, it is possible to secure the engine start torque TmES.

Further, the necessary amount of operation oil for the oil requiring elements such as the first clutch 2 can be secured by setting the target motor rotational speed Nm to the value at which the discharge rate or amount of the mechanical oil pump 8 becomes the lower limit rate or amount Q or more. Thus, a rise-up delay in the oil pressure when engaging the first clutch 2 after the engine startup as well as an prolonged engine start control time are prevented from occurring.

Moreover, it is made possible to prevent the heat generation amount of the first clutch 2 from becoming excessive by setting the heat generation amount of the first clutch 2 below the upper limit heat generation amount C, which may lead to preventing the clutch lifetime from being shortened.

At time t3, when the motor rotational speed Nm reaches the target rotational speed, the maximum output enabling torque TmMAX of the motor/generator 3 also increases to a value with which the engine start torque TmES can be acquired. Control proceeds from step S7 through step S8 to step S9, and increases the first clutch oil pressure to place the first clutch 2 in a half-engaged state in which the engine start torque TmES may be transmitted from the motor/generator 3 to the engine 1. Further, the engine 1 is started by the surplus torque TmV of the motor/generator 3. Thus, the engine rotational speed starts to increase gradually.

At time t4, accompanied by a complete combustion of the engine 1 to output a sufficient engine torque, control proceeds from step S10 through step S11 to step S12. At the same time, control proceeds from step S10 to step S11. Thus, the first clutch 2 will be fully engaged in response to increase in the first clutch oil pressure. On the other hand, the second clutch 4 will be placed in a half-engagement state in which a required drive torque will be transmitted from the motor/generator 3 to the left and right front wheels 9, 9. Moreover, control proceeds from steps S13 to S14 to control the motor rotational speed of the motor/generator 3 to increase the motor rotational speed Nm. Along with the increase in the motor rotational speed Nm, the maximum output enabling torque TmMAX of the motor/generator 3 is decreased.

At time t5, when the motor rotational speed Nm reaches the target rotational speed, and the motor rotational speed Nm, the engine rotational speed, and the transmission input rotational speed coincide with one another, control proceeds from steps S15 to S16 to increase the oil pressure of the second clutch 4 for complete engagement of the second clutch 4.

At time t6, when both the first clutch 2 and the second clutch 4 are fully engaged and the engine rotational speed, the motor rotational speed, and the transmission input rotational speed coincide with one another, control proceeds from steps S12 and S17 to step S20 to end the engine start control.

As described above, in the hybrid vehicle drive control system according to the first embodiment, the second clutch 4 is controlled to be disengaged to disconnect the torque transmission path between the motor/generator 3 and the belt type continuously variable transmission 5. Then, in the meantime, the motor/generator 3 is controlled to reduce the motor rotational speed Nm through a rotational speed control and increase the maximum output enabling torque TmMAX. Thus, with the motor rotational speed Nm even in a high range, the motor rotational speed can be reduced sufficiently to a rotational speed at which the maximum output enabling torque TmMAX may be acquired. Then, the extraneous torque TmOV enough to acquire the engine start torque TmES can be generated to perform the engine start control using this surplus torque Tm0V. Further, according to the first embodiment, since the rotational speed of the motor/generator 3 is controlled to increase the extraneous torque TmOV irrespective of the prevailing speed ratio or shifting operation of the belt type continuously variable transmission 5. Therefore, the motor rotational speed Nm can be reliably reduced to a necessary rotational speed to increase the extraneous torque TmOV even in a driving scene in which the transmission cannot be up-shifted such as during an engine startup in response to an accelerator pedal depression.

Consequently, the maximum output enabling torque or capacity TmMAX of the motor/generator 3 can be increased for starting the engine by the extraneous torque TmOV irrespective of the motor rotational speed Nm or a driving scene.

Further, the hybrid vehicle drive control system can prevent a decrease in the drive torque in response to the engine startup operation since the motor drive torque TmDR does not change at the engine startup.

Shift Control Operation

The hybrid vehicle drive control system according to the first embodiment is configured to shift down the belt type continuously variable transmission 5 upon the engine start request while the second clutch 4 is disengaged. That is, at time t2 in FIG. 4, when the oil pressure of the second clutch reaches the disengaging value and the second clutch 4 is disengaged, control proceeds through step S5 to step S18 to shift down the belt type continuously variable transmission 5 in the flowchart in FIG. 4

In the first embodiment, at time t3', the speed ratio starts rising at a time at which the first clutch 2 becomes half-engaged by the engagement capacity control to transmit the engine start torque TmES from the motor/generator 3 to the engine 1.

At this time, the speed ratio after shifting operation will be set arbitrarily depending on the required drive force and the engine torque after the engine start. Also, along with increase in speed ratio, the transmission input rotational speed starts to increase.

Then, at time t4 where the speed ratio reaches the target speed ratio and shift is complete, control proceeds through step S19 to step S20. Upon complete engagement of both the first and second clutches 2, 4, the engine start control ends.

By shifting down the belt type continuously variable transmission 5 while the second clutch 4 is being disengaged as above, the rotational speed of the transmission input shaft reaches the target value at time t4. Accordingly, the gear shift is executed in advance before the first and second clutches 2, 4 are fully engaged, thereby improving the responsivity of the accelerator.

Normal Engine Start Operation

Now, a description is given in a state in which the engine start torque TmES can be acquired by the extraneous torque TmOV upon output of an engine start request is described.

In this state, control proceeds from step S1 through S2 to step S3 in the flowchart of FIG. 4 to execute a "normal engine start control".

In this state, first, the second clutch 4 is slip-engaged. Then, the first clutch 2 is placed in a half-engaged state from the disengaged state in the "EV driving mode", and the engine 1 is cranked using the motor/generator 3 as a starter motor. Then, the engine 1 is started by fuel injection and ignition, and the first clutch 2 is fully engaged. Upon confirming that the first clutch 2 is fully engaged, the controller controls the second clutch 4 to be fully engaged and ends the normal engine start control.

At start of the normal engine start control, the torque control on the motor/generator 3 is changed to the rotational speed control, to allow the engine 1 to be cranked or a synchronous rotation. Also, the second clutch 4 is placed in a slip-engaged state in which a requested drive torque is transmitted from the motor/generator 3 to the right and left front wheels 9, 9. Thus, the second clutch 4 can absorb a torque variation due to the engine start control so that an engine start shock due to the torque variation transmitted to the right and left front wheels 9, 9 can be prevented.

Now, the effects of the hybrid vehicle drive control system according to the first embodiment are described below.

(1) In the drive system of a hybrid vehicle including an engine 1, a motor (motor/generator) 3, a first clutch 2 disposed between the engine 1 and the motor 3, and a second clutch 4 disposed between the motor 3 and the drive wheels (right and left front wheels) 9 9, upon receipt of an engine start request, a control system is configured to allow the first clutch 2 to be engaged to start the engine 1 using a motor torque (surplus torque) TmOV. Further, the control system is provided with a second clutch control means (step S4) to disengage the second clutch 4 upon the engine start request, and a motor rotational speed control means (step S6) to reduce the motor rotational speed Nm by a rotational speed control of the motor 3. Thus, it is possible to perform an engine start irrespective of the motor rotational speed Nm or drive or running scene of the vehicle while the second clutch 4 is being disengaged.

(2) A mechanical oil pump 8 operable by the rotational drive power of the motor shaft 3a of the motor 3 is further provided. The motor rotational speed control means (step S6) is configured to set a target motor rotational speed of the motor rotational speed Nm to a value at which the discharge amount or rate of the mechanical oil pump 8 becomes a lower limit amount Q or more. Thus, the discharge amount of the mechanical oil pump 8 is prevented from decreasing so that the necessary delivery amount of the operation oil in the oil requiring elements such as the first clutch 2 can be secured, which can prevent the engine start control from being extended.

(3) The motor rotational speed control means (step S6) is configured to set a target motor rotational speed Nm to a reduced value at which the heat generation amount of the first clutch 2 becomes the upper limit amount C or less. Thus, it is possible to prevent the rotational speed differential across the first clutch 2 from being excessive so that reduction in lifetime of the clutch may be prevented.

(4) A transmission (belt type continuously variable transmission) 5 disposed between the motor 3 and the drive wheels 9, 9 is provided. The control system further comprises a shift control means (step S18) configured to shift down the transmission 5 while the second clutch control means (step S4) is disengaging the second clutch 4 during the engine start request. Thus, it is possible to improve the responsivity of the accelerator at the engine startup.

(5) The motor rotational speed control means (step 6) is configured to reduce the motor rotational speed Nm by a rotational speed control of the motor 3 when a surplus torque obtained by subtracting a motor drive torque TmDR for vehicle propulsion from the maximum output enabling torque TmMAX of the motor 3 is determined to be less than an engine start torque TmES necessary for startup of the engine 1. Thus, it is possible to increase the maximum output enabling torque TmMAX of the motor/generator 3 irrespective of the motor rotational speed Nm or running scenes so that the engine start can be performed by the surplus torque TmOV.

Second Embodiment

Figure 11:
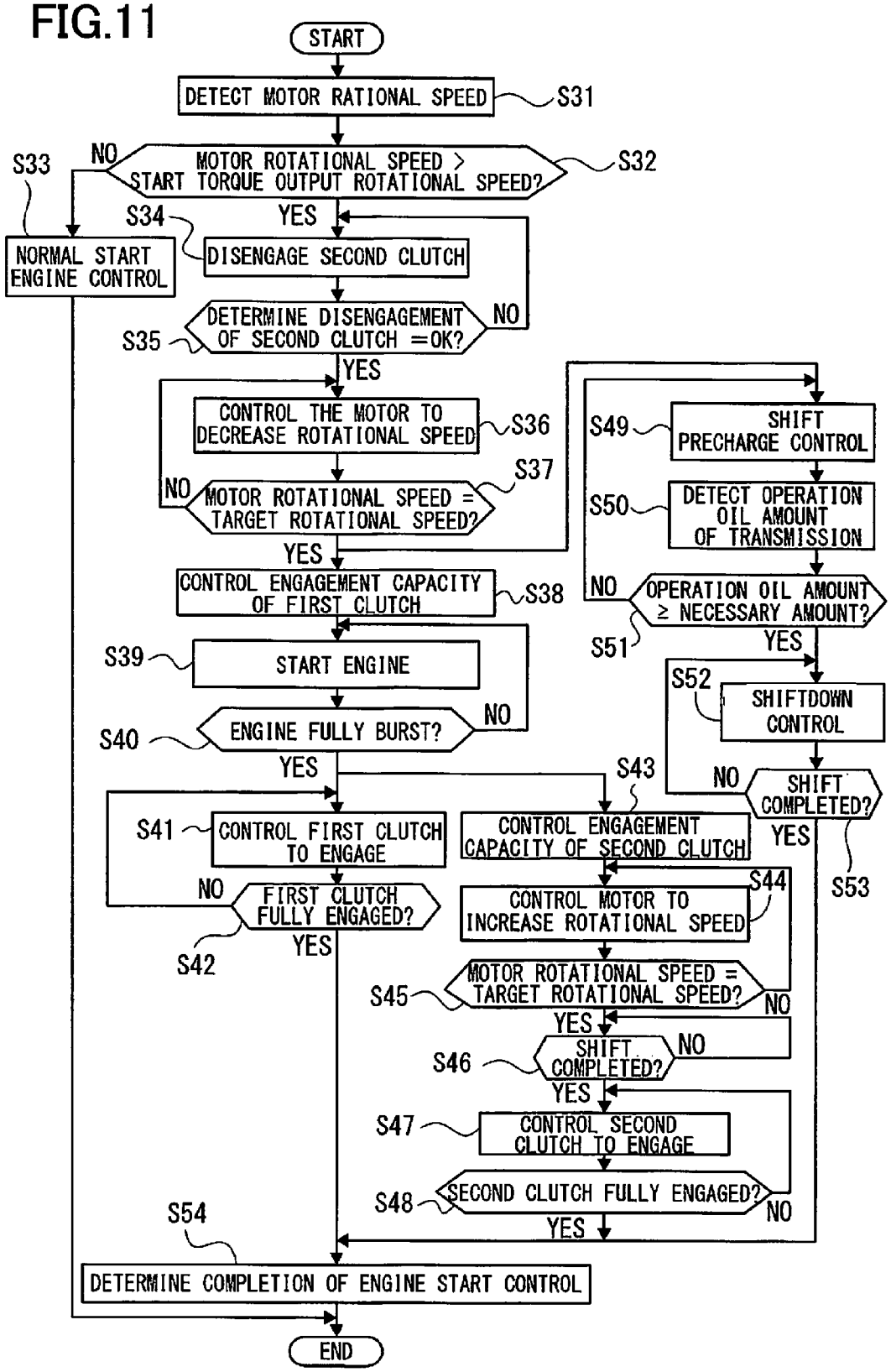
FIG. 11 is a flowchart for the engine start control process executed by the integrated controller of the FF hybrid vehicle to which the drive control system according to a second embodiment is applied.

A second embodiment describes an example where the shift control is executed after the operation oil amount supplied to the transmission has been secured. FIG. 11 is a flowchart for the engine start control by the integrated controller of the FF hybrid vehicle to which the drive control system according to the second embodiment is applied. In the following, each step in FIG. 11 is described, which illustrates the engine start control process in the second embodiment.

In step S31 along with an output of engine start request, the motor rotational speed sensor 28 detects the motor rotational speed Nm. Control then proceeds to step S32.

In step S32, following the detection of the motor rotational speed Nm in step S31, a determination is made on whether or not the motor rotational speed Nm exceeds the start torque output enabling rotational speed NmX. With YES (Nm>NmX), the motor/generator 3 is determined not to have a surplus torque needed for the engine startup, and control proceeds to step S34. With NO (Nm≤NmX), the motor/generator 3 is determined to have the surplus torque needed for the engine startup, and process proceeds to step S33.

In step S3, following the determination, Nm≤NmX (sufficient surplus torque available for the engine startup) in step S32, the normal engine start control is executed and control ends.

In step S34, following the determination, Nm>NmX (lack of the surplus torque necessary for the engine startup) in step S32, the second clutch 4 is disengaged and control proceeds to step S35. The step S34 corresponds to the second clutch control means for disengaging the second clutch 4.

In step S35, following the disengagement of the second clutch in step S34, a determination is made on whether or not the second clutch 4 is fully disengaged at a required level. With YES (full disengagement), control proceeds to step S36 while, with NO (incomplete disengagement), control returns to step S34.

In step S36, following the determination of full disengagement of the second clutch in step S35, the motor/generator 3 is controlled to decrease the motor rotational speed Nm and control proceeds to step S37. Note that the step S36 corresponds to the motor rotational speed control means for controlling the motor/generator 3 to decrease the motor rotational speed Nm to thereby increase the maximum output enabling torque TmMAX. The motor rotational speed Nm is reduced to the target rotational speed at which the engine start torque TmES can be attained, the discharge amount of the mechanical oil pump 8 becomes the lower limit amount or more, and the heat generation amount of the first clutch 2 becomes the upper limit amount or less.

In step S37, following the motor rotational speed control in step S36, a determination is made on whether or not the motor rotational speed Nm has reached the target rotational speed. With YES (Nm=target rotational speed), control proceeds to steps S38 and S49 while, with NO (Nm≠target rotational speed), control returns to step S36. The determination on whether or not the motor rotational speed Nm has reached the target rotational speed is made on the basis of a result of detection of the motor rotational speed sensor 28.

In step S38, following the determination, Nm=target rotational speed in step S37, the engagement capacity of the first clutch 2 is controlled and control proceeds to step S39. At this time, the first clutch 2 is controlled to half-engaged to transmit the engine start torque TmES from the motor/generator 3 to the engine 1.

In step S39, following the first clutch control in step S38, the engine 1 is driven by a fuel injection and ignition. Control proceeds to step S40.

In step S40, following the engine start in step S39, a determination is made on whether or not the engine 1 is fully combustible. With YES (engine full burst), control proceeds to steps S41 and S43 while, with NO (engine incomplete burst), control returns to step S39.

In step S41, following the determination of full combustion of the engine in step S40, the first clutch 2 is controlled to be engaged and control proceeds to step S42.

In step S42, following the first clutch engaging control in step S41, a determination is made on whether or not the first clutch 2 is fully engaged. With YES (first clutch fully engaged), control proceeds to step S54 while, with NO (first clutch incompletely engaged), control returns to step S41. In the present embodiment, the engagement of the first clutch 2 is determined based on whether or not the first clutch oil pressure has reached a prescribed value indicating a full engagement. That is, the first clutch is determined to be fully engaged if the oil pressure has already reached the prescribed value.

In step S43, following the determination of full engine combustion in step S40, the engagement capacity of the second clutch 4 is controlled and control proceeds to step S44. At this time, the second clutch 4 will be half-engaged to transmit a requested drive torque from the motor/generator 3 to the right and left front wheels 9, 9.

In step S44, following the second clutch engaging control in step S43, the rotational speed Nm of the motor/generator 3 is controlled to increase through a rotational speed control on the motor/generator 3, and control proceeds to step S45. The motor rotational speed Nm is controlled to increase to the target rotational speed which is obtained from the gear ratio after the shift down, vehicle speed and gear shift lines (FIG. 2).

In step S45 following the motor rotational speed control in step S44, a determination is made on whether or not the motor rotational speed Nm has reached the target rotational speed. With YES (Nm=target rotational speed), control proceeds to step S46. With NO (Nm≠target rotational speed), the control returns to step S44. Here, the determination on whether or not the motor rotational speed Nm has reached the target rotational speed is made on the basis of the result of detection of the motor rotational speed sensor 28.

In step S46, following the determination, Nm=target rotational speed in step S45, a determination is made on whether or not the shift control in which the belt type continuously variable transmission is shifted down has completed or concluded. With YES (shift completed), control proceeds to step S47 while, with No (shift not yet completed), step S46 is repeated. The determination of completion or conclusion of shifting is made based on the rotational speed of the transmission input shaft 4*a* representing a rotational speed of a primary pully of the belt type continuously variable transmission having reached a target rotational speed determined by a set speed ratio. In other words, the completion of shifting is determined when the rotational speed of the transmission input shaft 4*a* has reached the target rotational speed.

In step S47, following the determination of completion of shift in step S46, the second clutch 4 is controlled to be engaged. The control subsequently proceeds to step S48.

In step S48, following the second clutch engaging control in step S47, a determination is made on whether or not the second clutch 4 is fully engaged. With YES (second clutch engaged), control proceeds to step S54 and, with NO (second clutch not engaged), the control returns to step S47. The determination on the engagement of the second clutch 4 is made according to the oil pressure of the second clutch. That is, the second clutch 4 is determined to be fully engaged when the oil pressure thereof has reached a prescribed value.

In step S49, following the determination, Nm=target rotational speed in step S37, the belt type continuously variable transmission 5 is subjected to a shift precharge control and control proceeds to step S50. Note that the "shift precharge control" refers to controlling the operation oil amount flowing into an oil path to the two pulleys of the belt type continuously variable transmission 5 or an oil chamber to a necessary oil amount or more in order to apply primary and secondary oil pressures to the two pulleys continuously. Further, the "necessary oil amount" is intended to specify such an amount required to continuously apply oil pressure to the pulleys and set to an arbitrary value dependent on the specific belt type continuously variable transmission 5.

In step S50, following the shift precharge control in step S49, the operation oil rate (operation oil amount) supplied to the belt type continuously variable transmission 5 is detected. Control then proceeds to S51. In the present embodiment, the operation oil amount is detected by a flow rate sensor.

In step S51, following the detection of the operation oil amount in step S50, a determination is made on whether or not the operation oil amount supplied to the belt type continuously variable transmission 5 is at the necessary oil amount or more. With YES (operation oil amount≥necessary amount), control proceeds to step S52 while, with NO (operation oil amount<necessary amount), the control returns to step S49.

In step S52, following the determination that operation oil amount≥necessary oil amount in step 51, the belt type continuously variable transmission 5 is shifted down or controlled to have a larger speed ratio, and control proceeds to step S53. The speed ratio after the shifting is set in accordance with the required drive torque and the engine torque after the engine startup operation. Note that the step S52 corresponds to a shift control means for executing a downshift with the second clutch 4 disengaged in step S34 during the engine start request.

In step S53, following the execution of the shift control in step S52, a determination is made on whether or not the shift control has been completed or concluded. With YES (shift completed), control proceeds to step S54 while, with NO (shift incomplete), control returns to step S52. The determination of the shift completion or conclusion is made on the basis of the rotational speed of the transmission input shaft 4a representative of the rotational speed of the primary pulley of the belt type continuously variable transmission 5. That is, when the rotational speed of the transmission input shaft 4a has reached the target rotational speed, the completion or conclusion of the transmission is confirmed.

In step S54, following the determination of full engagement of the first clutch in step S42, the determination of full engagement of the second clutch in step S48, and the determination of completion of the shift control in step S19, the engine start control is determined to be completed, and the control ends.

Now, the operation of the control system for a hybrid vehicle in the second embodiment is described in an "engine start operation at insufficient start torque", and in "shift control operation", separately.

Engine Start Control at Insufficient Start Torque

Figure 12:
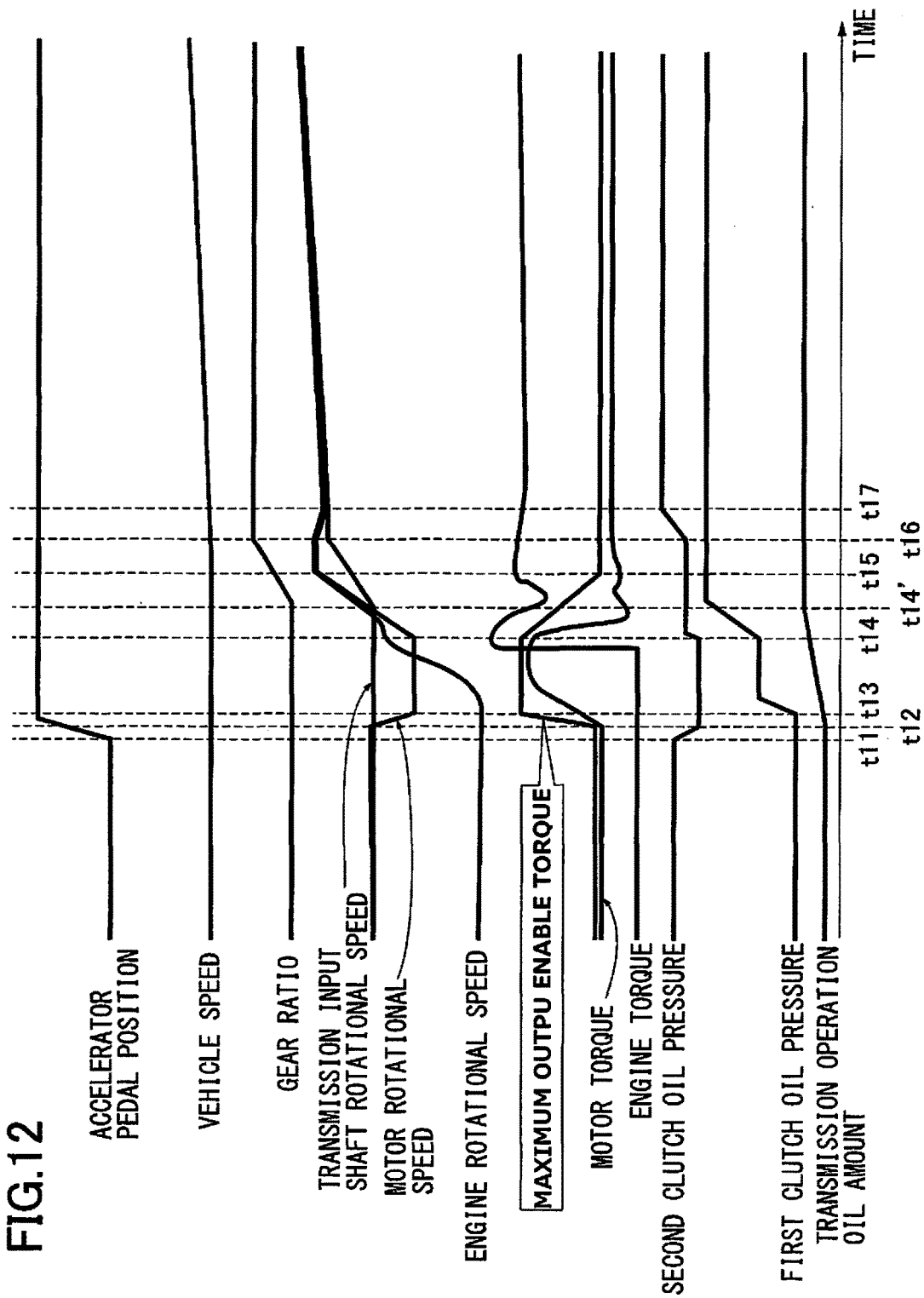
FIG. 12 is a timing chart of the respective characteristics of accelerator pedal position, vehicle speed, speed or gear ratio, rotational speed of transmission input shaft, motor rotational speed, engine rotational speed, motor torque, maximum output torque capacity, engine torque, second clutch oil pressure, first clutch oil pressure and transmission operation oil amount in the engine start control according to the second embodiment.

FIG. 12 is a timing chart of the characteristics of an accelerator pedal position, a vehicle speed, a speed ratio, a rotational speed of transmission input shaft, a motor rotational speed, an engine rotational speed, a motor torque, a maximum output enabling torque, an engine torque, a second clutch oil pressure, a first clutch oil pressure and a transmission operation oil amount in the engine start control, respectively, according to the second embodiment.

At time t11 in FIG. 12, when the accelerator is stepped on and the drive or operation point (APO, VSP) in the EV range crosses the EV→HEV switch line (=engine start line) in the EV-HEV selection map in FIG. 3, an engine start request is output. Thus, control proceeds from step S31 to step S32 in the flowchart in FIG. 11 and a determination is made on whether or not the motor rotational speed Nm exceeds the start torque output rotational speed NmX. When the motor rotational speed Nm is too high and the engine start torque TmES cannot be obtained by the surplus torque TmOV, control proceeds to step S34 to control the second clutch 4 to disengage. Thus, from time t11 on, the second clutch oil pressure starts decreasing.

At time t12, the second clutch oil pressure reaches the disengage value and the second clutch 4 is disengaged. The control proceeds from step S35 to step S36 to control the motor rotational speed Nm of the motor/generator 3 to decrease.

At time t13, when the motor rotational speed Nm reaches the target rotational speed, the maximum output enable torque TmMAX of the motor/generator 3 increases to a value at which the engine start torque TmES can be acquired. The control proceeds from step S37, through step S38 to step S39 and raises the first clutch oil pressure to place the first clutch 2 in a half-engaged state so as to transmit the engine start torque TmES from the motor/generator 3 to the engine 1. Then, the engine 1 is started by the surplus torque TmOV of the motor/generator 3. Thus, the engine rotational speed starts to increase gradually.

At time t14, when the engine 1 is fully combustible and outputs a sufficient amount of engine torque, control proceeds from step S40, through step S41 to step S42 concurrently proceeding from step S40 to step S43. Thus, the oil pressure of the first clutch 2 is increased and the first clutch 2 is subsequently fully engaged. Meanwhile, the second clutch 4 is slip-engaged to transmit a requested drive torque from the motor/generator 3 to the right and left front wheels 9, 9. Moreover, control proceeds from steps S43 to S44 to control the motor rotational speed Nm of the motor/generator 3 to increase.

At time t15, when the motor rotational speed Nm reaches the target rotational speed, then, control proceeds from steps S45 to S46 to determine whether or not the shift control on the belt type continuously variable transmission 5 has been completed. With the shift control being not completed, i.e., when the transmission input shaft 4a has not reached the target rotational speed, then the gear shift control is determined to be incomplete, so that the slip-engagement state of the second clutch 4 will be maintained.

At time t16, when the rotation speed of the transmission input shaft 4a reaches the target rotational speed and the gear shift control is completed, then, the controller proceeds from steps S46 to S47 to raise the oil pressure of the second clutch 4 to thereby fully engage the second clutch 4.

At time t17, when both the first and second clutches 2, 4 are fully engaged, the motor rotational speed Nm, the engine rotational speed, and the transmission input rotational speed coincide with one another. Then, control proceeds from step S42, through step S48 to step S54 to end the engine start control.

As described above, the hybrid vehicle control system according to the second embodiment also controls the second clutch 4 to be disengaged and disconnects the torque transmission path between the motor/generator 3 and the belt type continuously variable transmission 5. In the meantime, a rotational speed control is executed to reduce the motor rotational speed Nm of the motor/generator 3 to increase the maximum output enable torque TmMAX. Thus, the maximum output enable torque TmMAX of the motor/generator 3 can be increased irrespective of the motor rotational speed Nm or running scenes to start the engine by the surplus torque TmOV.

Shift Control Operation

In the hybrid vehicle control system according to the second embodiment, at an issuance of the engine start request, the belt type continuously variable transmission 5 is shifted down when the operation oil amount supplied thereto reaches a necessary amount or more during reduction of the motor rotational speed Nm. That is, at time t12 in FIG. 12, when the oil pressure of the second clutch reaches the disengage value and the second clutch 4 is disengaged, then, the control system proceeds from steps S35 to S36 in FIG. 11 to control the motor/generator 3 to reduce the motor rotational speed Nm.

At time t13, when the motor rotational speed Nm reaches the target rotational speed and the maximum output enable torque TmMAX of the motor/generator 3 rises to a value at which the engine start torque TmES can be acquired, then the control system proceeds from step S37 through step S49 to step S50 to execute the shift precharge control on the belt type continuously variable transmission 5 so as to increase the operation oil amount supplied thereto while detecting the operation oil amount or rate.

At time t14' when the operation oil amount supplied to the belt type continuously variable transmission 5 reaches the necessary amount, control proceeds from steps S51 to step S52 to shift down the belt type continuously variable transmission 5. Thus, the speed ratio starts rising and the rotational speed of the transmission input shaft starts rising in response to the change in the speed ratio.

Note that, in the second embodiment, since the second clutch 4 is in the slip-engaged state by the engagement capacity control at time t14, the control system starts the shiftdown upon the operation oil amount reaching the necessary amount.

At time t16, when the speed ratio reaches the target gear ratio, thus completing the shift, control proceeds from steps S53 to S54, waiting for the full engagement of both the first and second clutches 2, 4 to end the engine start control.

Thus, since the belt type continuously variable transmission 5 is subjected to the shift control subsequent to the shift precharge control completion to increase the operation oil amount thereof to the necessary amount. Thus, it is possible to prevent the shift control from being started despite an insufficient operation oil amount. That is, the operation oil is discharged from the mechanical oil pump 8 which operates by the rotational power of the output shaft, i.e., the motor shaft 3a, of the motor/generator 3 is used for both the engage and disengage control of the first clutch 2 and the shift control of the belt type continuously variable transmission 5. Therefore, by starting the shift at a time at which the oil pressure used for both the engagement/disengagement control of the first clutch 2 and the shift control of the belt type continuously variable transmission are well balanced, it is possible to prevent the oil pressure from running short during shifting operation with shifting time being extended.

Accordingly, the automatic vehicle transmission in the second embodiment can attain the effects below:

(6) The shift control means (step S52) is configured to shift down the transmission (belt type continuously variable transmission) 5 when the operation oil amount supplied to the transmission is the necessary amount or more. Thus, it is possible to prevent the gear shift control from being started despite an insufficient operation oil amount and to prevent the shortage of oil pressure during shift, to thereby prevent the shift time from being extended.

Although the hybrid vehicle control system according to the present invention has been described in terms of the first and second embodiments, the specific configurations are not limited thereto. It should be appreciated that variations, modifications or additions may be made in the embodiments described by persons skilled in the art without departing from the scope of the present invention as defined by claims.

The first embodiment describes an example where the motor rotational speed Nm is reduced to somewhere between the target values Nm1 and Nm2, wherein Nm2>Nm1, the value Nm1 representing a value at which the discharge amount of the mechanical oil pump becomes the lower limit amount Q or more while Nm2 at representative of a value at which the heat generation amount of the first clutch 2 becomes the upper limit amount C. However, if the value Nm2 corresponding t the upper limit heat generation amount C of the first clutch 2 is lower than the value Nm1 corresponding to the lower limit flow rate Q in discharge amount of the mechanical oil pump 8, the motor rotational speed Nm may reduced to the target value Nm1 representing the lower limit flow rate Q in the discharge amount of the mechanical oil pump 8 or more. Thus, it is made possible to take priority of securing the discharge amount of the mechanical oil pump 8 over reducing the heat generation of the first clutch 2, to adequately supply the operation oil to the oil requiring elements and execute the engine start control and shift control smoothly.

Moreover, the second embodiment describes to detect the operation oil amount supplied to the belt type continuously variable transmission 5 by the flow rate or amount sensor. However, the present invention is not limited thereto. For example, a timer can be provided to count the elapse of a predetermined length of time concurrently with the start of the gear shift precharge control when the motor rotational speed Nm reaches the target rotational speed. The completion (i.e., operation oil amount=required amount) of the precharge can be determined when the time has elapsed, to subsequently start the shiftdown. Thus, by managing the operation oil amount by the timer, the flow rate sensor may be eliminated.

Moreover, in each embodiment described above, the second clutch is disengaged and the torque transmission path between the motor/generator 3 and right and left front wheels 9, 9 is disconnected when the surplus torque TmOV is determined to be smaller than the engine start torque TmES. However, this "disengagement of the second clutch 2" does not necessarily mean a full disengagement only, but a slip-engagement is included. That is, the second clutch 4 can be in the slip-engaged state as long as the torque transmission path between the motor/generator 3 and the right and left front wheels 9, 9 is determined to be disconnected.

Further, although the above embodiments execute the clutch engagement capacity control subsequent to the complete combustion of the engine. However, the execution of the second clutch 4 may be done even prior to the complete combustible state of the engine. In other word, before the complete combustion of the engine 1, a torque flow path may be established between the motor/generator 3 and left/right front wheels 9, 9.

Further, in the embodiments described above, an example is showing which a motor/generator capable of generating electricity is used as a motor, it is sufficient when the drive force will be output to the engine via the first clutch 2 shile the drive force may be output to drive wheels via the second clutch 4. Further, the above embodiments describe an example where the belt type continuously variable transmission is used for the transmission. However, an automatic multi-gear transmission can also be used.

The above embodiments describe an example where the hybrid vehicle drive control system is applied to the FF hybrid vehicle. However, the control system for a hybrid vehicle according to the present invention may be applicable to a drive system of a FR hybrid vehicle, that of 4WD hybrid vehicle, and the like so far as the hybrid vehicle is of a so-called one-motor-two-clutch type including an engine, a motor, a first clutch and a second clutch.

The invention claimed is:

1. A hybrid vehicle drive control system for a hybrid vehicle which comprises a drive system including an engine, a motor, a first clutch disposed between the engine and the motor, a second clutch disposed between the engine and a drive wheel, and operative, upon receipt of an engine start request, to engage the first clutch to thereby start the engine using a torque of the motor, the hybrid vehicle drive control system comprising:
   a first controller programmed to conduct a second clutch control of the second clutch to disconnect a torque transmission path between the motor and the drive wheel upon the engine start request;
   a second controller programmed to reduce a motor rotational speed through a motor rotational speed reduction control of the motor while the torque transmission path between the motor and the drive wheel is disconnected;
   a third controller programmed to engage the first clutch to start the engine using the torque of the motor while the motor rotational speed is reduced, and to fully engage the second clutch after complete combustion of the engine; and
   a fourth controller programmed to conclude a downshift of a transmission, during a time from starting the engine to a time of full engagement of the second clutch in the torque transmission path between the motor and the drive wheel being disconnected,
   the second controller being further programmed to set a target motor rotational speed for the motor rotational speed reduction control to be equal to or greater than a lower limit amount, the lower limit amount being a value at which a discharge amount of a mechanical oil pump is at a minimum discharge amount necessary to operate the first clutch, the mechanical oil pump being operable by a rotational drive power of a motor shaft of the motor, and
   the second controller being further programmed to set the target motor rotational speed for reduction to be less than or equal to an upper limit amount, the upper limit amount being a value that secures a minimum lifetime of the first clutch.

2. The hybrid vehicle drive control system as claimed in claim 1, wherein
   the second controller is further programmed to conduct the motor rotational speed reduction control of the motor when a surplus torque obtained by subtracting a motor drive torque for vehicle propulsion from a maximum output enable torque of the motor is determined to be less than an engine start torque necessary for startup of the engine.

* * * * *